United States Patent
Suzuki

(10) Patent No.: US 7,334,618 B2
(45) Date of Patent: Feb. 26, 2008

(54) PNEUMATIC TIRE WITH TREAD HAVING CAP LAYER AND SPACED APART BASE LAYERS

(75) Inventor: Kazuya Suzuki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 40 days.

(21) Appl. No.: 10/880,514

(22) Filed: Jul. 1, 2004

(65) Prior Publication Data
US 2005/0045258 A1 Mar. 3, 2005

(30) Foreign Application Priority Data
Sep. 3, 2003 (JP) ............... 2003-310962

(51) Int. Cl.
*B60C 1/00* (2006.01)
*B60C 11/00* (2006.01)

(52) U.S. Cl. .............. 152/152.1; 152/209.5; 152/209.18; 152/DIG. 2

(58) Field of Classification Search ............ 152/152.1, 152/209.5, 209.18, DIG. 2
See application file for complete search history.

(56) References Cited

U.S. PATENT DOCUMENTS

| | | | |
|---|---|---|---|
| 4,478,266 A | 10/1984 | Pierson et al. | |
| 5,942,069 A | 8/1999 | Gerresheim et al. | |
| 6,269,854 B1 * | 8/2001 | Matsuo et al. | 152/DIG. 2 |
| 6,336,486 B1 * | 1/2002 | Iwasaki et al. | 152/209.5 |
| 2005/0039834 A1 * | 2/2005 | Suzuki | 152/209.5 |

FOREIGN PATENT DOCUMENTS

| | | | |
|---|---|---|---|
| EP | 780245 | * | 6/1997 |
| EP | 798142 | * | 10/1997 |
| EP | 1 069 160 A1 | | 1/2001 |
| JP | 9-71112 A | | 3/1997 |
| JP | 11-115414 | * | 4/1999 |
| JP | 2000-16010 | * | 1/2000 |
| JP | 2000-079805 | * | 3/2000 |
| JP | 2003-104009 | * | 4/2003 |
| JP | 2003-104009 A | | 4/2003 |

* cited by examiner

*Primary Examiner*—Steven D. Maki
(74) *Attorney, Agent, or Firm*—Birch, Stewart, Kolasch & Birch, LLP

(57) ABSTRACT

A tread (14) of a tire (10) includes a tread rubber layer (16). The tread rubber layer (16) has a two-layer structure including a base layer (23) and a cap layer (24). The base layer (23) is provided with a comb-shaped convex portion (26). The convex portion (26) is formed like a circle extended in the circumferential direction of the tire (10). A plurality of convex portions (26) is arranged in the axial direction of the tire (10) and is protruded in a radial direction. At least a part of the convex portions (26) is exposed to a tread surface (17) when the tire (10) is unused (brand-new). The cap layer (24) contains silica and the base layer (23) does not contain the silica.

4 Claims, 4 Drawing Sheets

PNEUMATIC TIRE WITH TREAD HAVING CAP LAYER AND SPACED APART BASE LAYERS

This application claims priority on Patent Application No. 2003-310962 filed in Japan on Sep. 3, 2003.

BACKGROUND OF THE INVENTION

1. Field of the Invention

The present invention relates to a structure of a pneumatic tire (hereinafter referred to as a "tire").

2. Description of the Related Art

A portion to come in contact with the road surface of a tire is particularly referred to as a tread. The tread has a tread rubber layer. The physical properties of a rubber constituting the tread rubber layer directly influence the performance of the tire. Conventionally, importance has been particularly attached to a wet grip performance and a rolling resistance in the performance of the tire. In the case in which the wet grip performance is enhanced, however, the rolling resistance generally tends to be increased. For this reason, the tire has conventionally been improved to suppress a rise in the rolling resistance with an enhancement in the wet grip performance. More specifically, silica is blended with the rubber constituting the tread rubber layer in place of carbon black to be a reinforcing agent. Alternatively, the tread rubber layer is constituted to have a two-layer structure including outer and inner layers, and the outer layer is constituted by a rubber having an excellent grip performance and the inner layer is constituted by a rubber of a low heat generating type. This has been disclosed in Japanese Laid-Open Patent Publication No. 2003-104009, for example.

In some cases in which the silica is blended with the rubber constituting the tread rubber layer, however, the silica has a poor conductiveness and static electricity is therefore stored in a vehicle to which the tire is attached. In order to prevent the storage, polyethylene glycol ester or the like is blended as an antistatic agent with the rubber constituting the tread rubber layer in some cases. Even if such an antistatic agent is used, however, the following trouble is made. More specifically, when the amount of the polyethylene glycol ester to be blended is small, an antistatic effect is reduced. On the other hand, when the amount of the polyethylene glycol ester to be blended is large, there is a problem in that the antistatic effect is obtained but the abrasion resistance performance of a tire is deteriorated by blending the antistatic agent.

In order to eliminate the drawback, conventionally, a conductive layer is formed and a conductive member is provided on an inside in the radial direction of the tread rubber layer. The conductive member is connected to the conductive layer and is provided to penetrate through the outer peripheral surface (tread surface) of a tread portion. This has been disclosed in Japanese Laid-Open Patent Publication No. 9-71112, for example. When the conductive member is thus disposed, static electricity is grounded through the conductive member. Consequently, the antistatic effect can be obtained. However, the conductive member is provided in the radial direction of the tire. Therefore, there is a problem in that a two-layer structure to reconcile a high wet grip performance to a low rolling resistance is formed well with difficulty.

SUMMARY OF THE INVENTION

The present invention has been made in such a background. It is an object of the present invention to provide a tire which exhibits a high antistatic effect and reduces a rolling resistance.

(1) In order to attain the object, a tire according to the present invention comprises a tread having a base layer provided on an inside in a radial direction and a cap layer provided on an outside in the radial direction and provided with a groove on an outer peripheral surface constituting a tread surface, thereby forming a tread pattern. The base layer is provided with a plurality of circular convex portions which is arranged in an axial direction. The circular convex portions are protruded in the radial direction and are extended in a circumferential direction. At least one of the circular convex portions is exposed to the tread surface in nonuse.

According to this structure, the tread has a two-layer structure having the base layer and the cap layer. The base layer is provided with a plurality of circular convex portions, and at least one of them is exposed to the tread surface. In other words, the circular convex portion is exposed to the tread surface of the tire in the circumferential direction. Also in the case in which a rubber constituting the cap layer is not particularly excellent in a conductiveness, therefore, electricity can easily be carried between the tire and a road surface. Accordingly, also in the case in which silica is blended with a rubber constituting the tread, for example, a conductiveness between the tire and the road surface can be maintained and a rolling resistance can be reduced.

(2) It is possible to employ such a structure that the cap layer contains silica and the base layer does not contain the silica. With this structure, the silica is blended with only the cap layer. Therefore, a wet grip performance can effectively be enhanced for only the contact portion of the tire, and furthermore, the rolling resistance can be reduced.

(3) It is desirable to employ a structure in which the grooves are provided on the outer peripheral surface so that a plurality of circular land portions is formed on the outer peripheral surface, and the circular convex portions are provided in one of the circular land portions. With this structure, the number of the circular convex portions to be exposed to the tread surface is increased. Consequently, the conductiveness can be enhanced still more.

(4) The base layer may have a hardness set to be smaller than that of the cap layer. In that case, it is preferable that the hardnesses of the base layer and the cap layer should have JIS A hardnesses set to be 55 to 65. With this structure, the wet grip performance of the tire can further be enhanced, and furthermore, the rolling resistance can further be reduced.

According to the present invention, the tread has the two-layer structure, and a plurality of circular convex portions is provided on the base layer to be an inner layer and is exposed to the tread surface. Also in the case in which the rubber constituting the cap layer is not particularly excellent in the conductiveness, therefore, a sufficient conductiveness can be maintained between the tire and the road surface. As a result, also in the case in which the silica is blended with the rubber constituting the tread, for example, the tire can exhibit a high conductiveness and can reduce the rolling resistance.

DESCRIPTION OF THE PREFERRED EMBODIMENTS

The present invention will be described below in detail based on a preferred embodiment with reference to the drawings.

Figure 1:
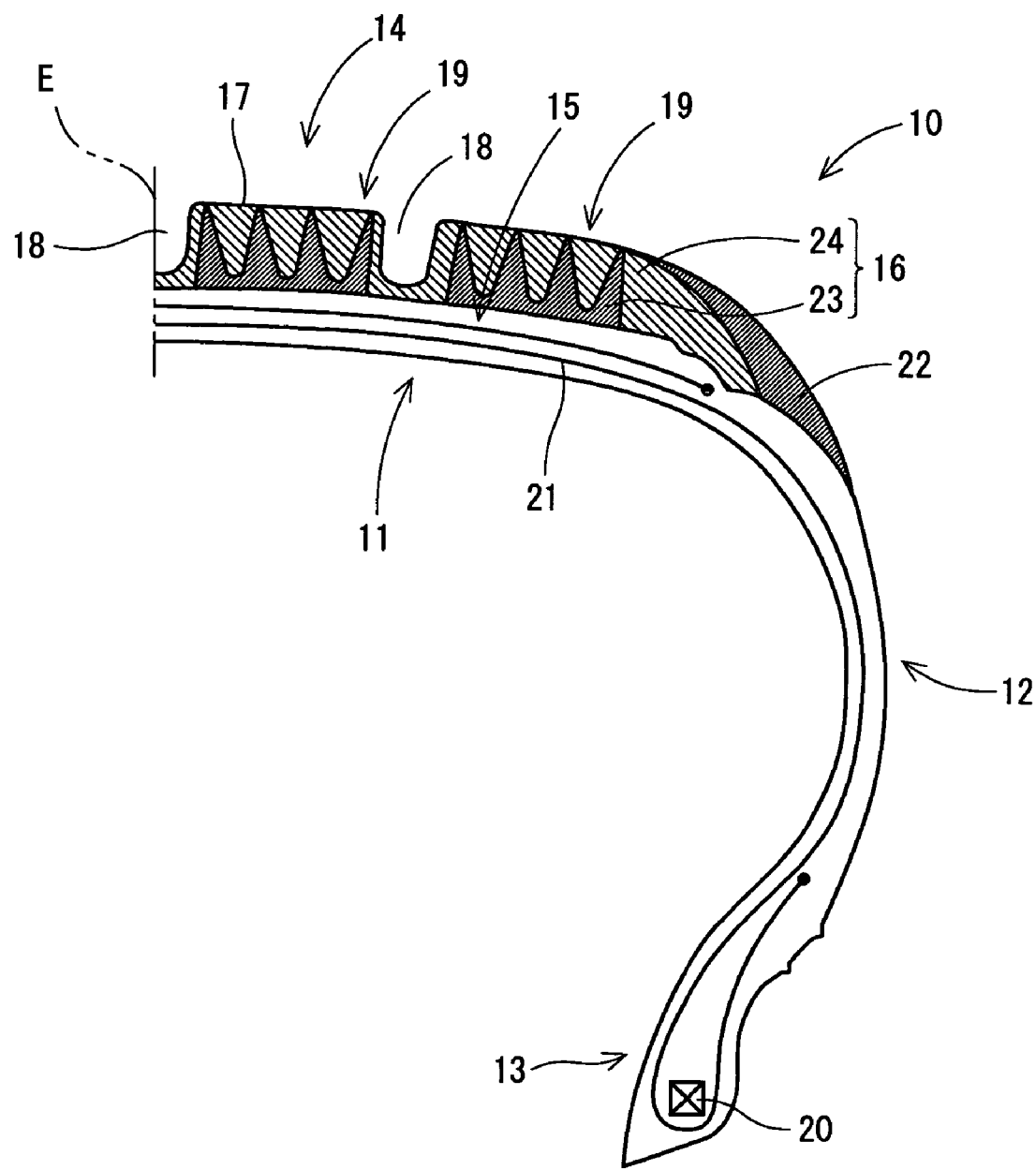
FIG. 1 is an enlarged sectional view showing the main part of a tire according to an embodiment of the present invention.

FIG. 1 shows a section taken along a plane which passes through the center of a tire 10 and is orthogonal to an equator plane E of the tire 10. In FIG. 1, a vertical direction is set to be a radial direction of the tire 10 and a transverse direction is set to be an axial direction of the tire 10. The tire 10 takes an almost symmetrical shape about the equator plane E, and has a carcass 11, a sidewall 12, a bead 13 and a tread 14 and is provided with a belt 15 for reinforcing the carcass 11.

The tread 14 includes a tread rubber layer 16 formed of a crosslinked rubber. The tread rubber layer 16 is formed to take the shape of an almost circular arc to be outward convex in the radial direction. The outer peripheral surface of the tread rubber layer 16 constitutes a tread surface 17 to come in contact with a road surface. The tread surface 17 is provided with a groove 18. Consequently, a land portion 19 is formed on the tread 14. By the presence of the groove 18 and the land portion 19, a tread pattern is formed. The structure of the tread rubber layer 16 will be described below in detail.

The sidewall 12 is extended inward in the radial direction from both ends of the tread 14. A buttress portion 22 is provided in a boundary part between the sidewall 12 and the tread 14. The sidewall 12 is also formed of a crosslinked rubber. By a flexure, the sidewall 12 absorbs a shock generated from the road surface. Moreover, the sidewall 12 prevents the external damage of the carcass 11.

The bead 13 has a bead core 20. The bead core 20 is formed circularly. The bead core 20 is formed by a plurality of non-extensible wires (typically, wires formed of steel).

The carcass 11 includes a carcass ply 21. The carcass ply 21 constitutes the frame of the tire 10. The carcass ply 21 is provided along the inner peripheral surfaces of the tread 14, the sidewall 12 and the bead 13 and is laid over the bead core 20. The belt 15 is obtained by covering a belt cord with a crosslinked rubber and covers and reinforces the carcass 11.

The carcass 11, the belt 15, the sidewall 12, the bead 13 and the like are manufactured by a general method which has conventionally been employed, and these are constituted integrally in the tire 10 which is formed.

As described above, the tread 14 includes the tread rubber layer 16 formed of the crosslinked rubber. The buttress portion 22 is formed in the boundary part between the tread rubber layer 16 and the sidewall 12. The present embodiment features the structure of the tread rubber layer 16. More specifically, the present embodiment is characterized in that:

(1) the tread rubber layer 16 has a two-layer structure including a base layer 23 and a cap layer 24, which is poor in conductivity;

(2) the base layer 23 is exposed to the tread surface 17 when the tire 10 is not used (brand-new); and (3) the base layer 23 is formed by a material which will be described below and is provided in a position which will be described later.

Figure 2:
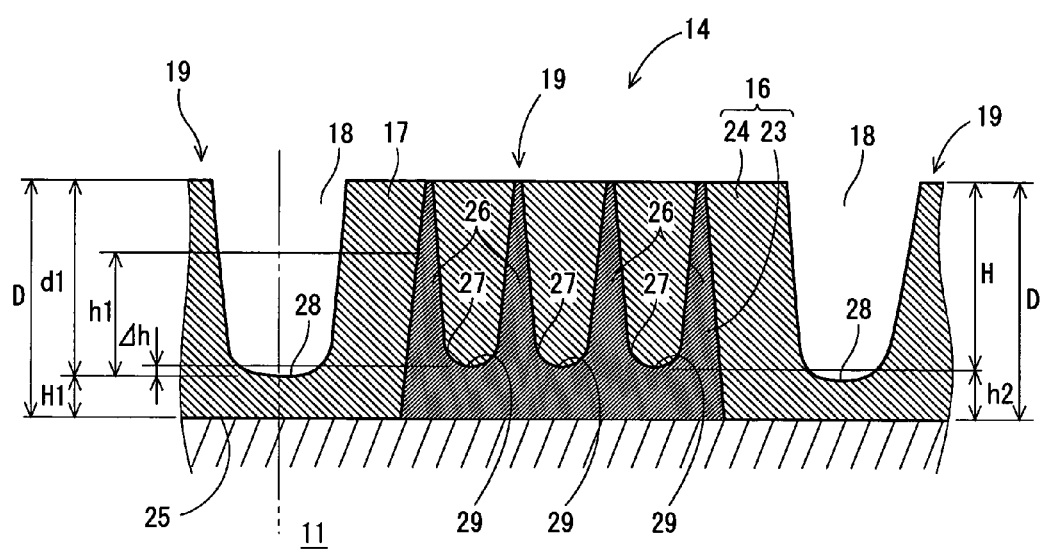
FIG. 2 is an enlarged sectional view showing the main part of the tread of the tire according to the embodiment of the present invention.

As shown in FIG. 2, the base layer 23 is formed like a comb protruded outward in the radial direction, and the cap layer 24 is provided to cover the base layer 23 at an outside in the radial direction. The base layer 23 and the cap layer 24 are constituted by a rubber (referred to as a "tread rubber"), respectively. The base layer 23 and the cap layer 24 are constituted by heating (crosslinking), for a predetermined time, a base material (rubber) to which a crosslinking agent or another compound is added. For the base material, it is possible to employ a natural rubber (NR), a stirene-butadiene rubber (SBR), a butadiene rubber (BR), an isoprene rubber (IR) or their mixtures, and particularly, it is preferable that the stirene-butadiene rubber (SBR) should be employed. Carbon black, silica or the like may be added as a reinforcing agent to the base material. Moreover, other various fillers may be added to the base material.

In the present embodiment, these reinforcing agents and the like are employed. Therefore, the hardness of the base layer 23 is different from that of the cap layer 24. More specifically, the hardness of the base layer 23 has a JIS A hardness set to be 60 and the hardness of the cap layer 24 has a JIS A hardness set to be 64. The hardnesses of the base layer 23 and the cap layer 24 are not restricted to these values. It is preferable that the hardness of the base layer 23 should be set to be smaller than that of the cap layer 24 and both of the hardnesses should have the JIS A hardnesses set to be 55 to 65. In the present embodiment, moreover, the silica is blended with the cap layer 24 and is not blended with the base layer 23.

The groove 18 is provided on the outer peripheral surface of the cap layer 24 (the tread surface 17). The groove 18 is formed circularly on the tread surface 17 in the circumferential direction. In the present embodiment, the groove 18 is provided in the central part of the tread surface 17, and is provided symmetrically in an axial direction about the central part (see FIG. 1). Indeed, it is a matter of course that a large number of grooves 18 may be provided asymmetrically based on the equator plane E.

As shown in FIG. 2, the groove 18 is formed in such a manner that an internal wall surface thereof takes an almost U shape. In the present embodiment, a thickness D of the tread rubber layer 16 is set to be 10 mm and a depth d1 of the groove 18 is set to be 8.2 mm. Accordingly, a subtread gauge H1 is set to be 1.8 mm. The subtread gauge H1 represents a distance between an inner bottom portion 28 of the groove 18 and a bottom face 25 of the tread rubber layer 16. These dimensions D, d1 and H1 are properly designed and changed according to the specifications of a tire.

The base layer 23 is formed like a comb as described above, and includes a plurality of convex portions 26 (circular convex portions) as shown in FIG. 2. As shown in FIG. 1, these base layers 23 are arranged in the axial direction of the tire 10 and the convex portion 26 of each base layer 23 is provided to be buried in the land portion 19. More specifically, as shown in FIG. 2, the base layer 23 has four convex portions 26. Each of the convex portions 26 is arranged in the radial direction (the transverse direction in FIG. 2), and the adjacent convex portions 26 are provided smoothly and continuously by a circular arc portion 27. Although the number of the convex portions 26 is not restricted to four, it is preferable that the number of the convex portions 26 to be provided in one land portion 19 should be two to five.

A height h1 of the convex portion 26 is properly set to be 15% to 50% of the depth d1 of the groove 18. The height h1 of the convex portion 26 represents a distance between the top portion of the convex portion 26 and the inner bottom portion 28 of the groove 18. On the other hand, a dimension H from a base bottom portion 29 of the circular arc portion 27 (the base bottom portion of the base layer) to the tread surface 17 is set to be 8.0 mm. Since the thickness D of the tread rubber layer 16 is set to be 10 mm, accordingly, a dimension h2 from the base bottom portion 29 of the circular arc portion 27 to the bottom face 25 of the tread rubber layer 16 is set to be 2.0 mm.

A ratio of the base layer 23 to the cap layer 24 can be variously designed and changed. The ratio of the base layer 23 to the cap layer 24 represents a ratio of the dimension h2 to the dimension H. The ratio is preferably set to be h2:H=10:90 to 30:70, and furthermore, is more preferably set to be h2:H=20:80 to 30:70.

The base bottom portion 29 is placed in a position having a dimension Δh on the basis of the inner bottom portion 28 of the groove 18 and Δh≦1.6 mm is set. Thus, the dimension Δh is set to be 1.6 mm or less so that the following effects can be obtained.

If the dimension Δh is set to be greater than 1.6 mm, the base layer 23 is wholly exposed so that the grip force of the tire 10 tends to be greatly reduced at the last stage of the wear of the tire 10 (usually at a time that the depth of the groove 18 is 1.6 mm). However, Δh≦1.6 mm is set as in the present embodiment so that a rate at which the cap layer 24 remains on the tread surface 17 is increased at the last stage of the wear of the tire 10. Accordingly, a reduction in the grip force of the tire 10 can be suppressed.

While the base bottom portion 29 is placed on an outside in the radial direction (above in FIG. 2) on the basis of the inner bottom portion 28 of the groove 18 in the present embodiment, it is not restricted. The base bottom portion 29 may be positioned on an inside in the radial direction (below in FIG. 2) on the basis of the inner bottom portion 28 of the groove 18.

Figure 3:
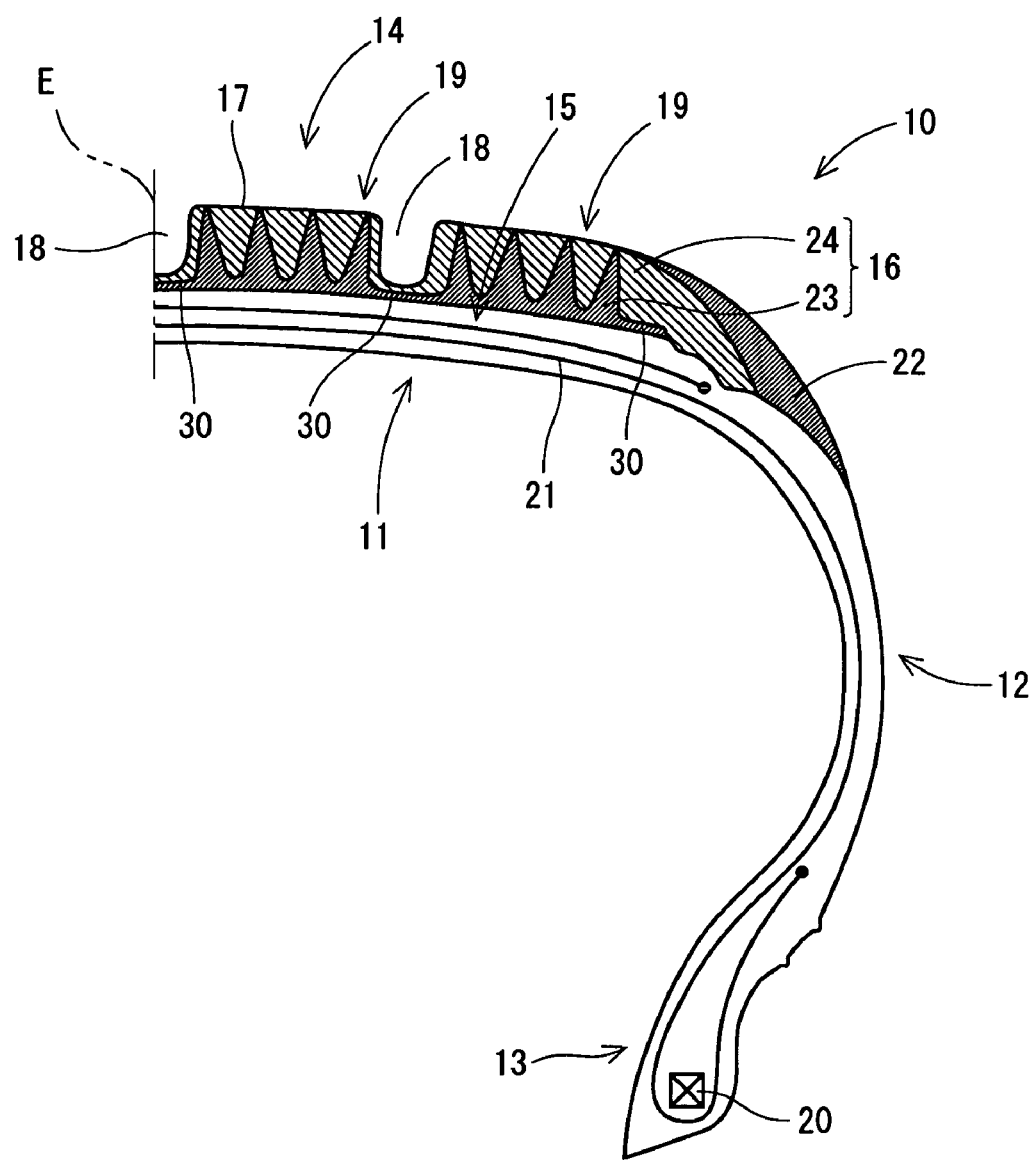
FIG. 3 is an enlarged sectional view showing the main part of a tire according to a variant of the embodiment of the present invention.

While the base layer 23 is constituted to be formed in each land portion 19 as shown in FIG. 1 in the present embodiment, such a structure is not restricted. As shown in FIG. 3, a thin film layer 30 may be provided in the lower part of each base layer 23 (an inside in the radial direction) and each base layer 23 may be provided continuously through the thin film layer 30. The base layer 23 is thus provided continuously so that the following advantages can be obtained.

When the tire 10 is to be manufactured, a rubber sheet constituting the tread rubber layer 16 is subjected to extrusion molding. More specifically, a rubber constituting the cap layer 24 and a rubber constituting the base layer 23 are fed separately to one die plate and are extruded at the same time. Thus, the rubber sheet constituting the tread rubber layer 16 is formed. In the case in which the base layer 23 is continuously provided through the thin film layer 30, accordingly, there is an advantage that a molding work using the die plate can easily be carried out. Moreover, the thin film layer 30 is provided so that the rate of the area of the base layer 23 over the section of the tread layer 16 is increased and the heat generation of the tire 10 can be thus suppressed still more. As a result, it is possible to enhance a durability at a high speed of the tire 10.

EXAMPLES

Although the advantages of the present invention will be apparent below from examples, the present invention should not be construed to be restricted to the description of the examples.

Table 1 shows the result of the execution of a comparison test over a conventional tire (comparative examples 1 to 3) for a rolling resistance and an electric resistance value in a tire according to each of examples 1 to 6 of the present invention. The electric resistance value of the tire according to each of the examples and the comparative examples is measured based on an electric resistance test which will be described below. Referring to the rolling resistance of the tire according to each of the examples and the comparative examples, the rolling resistance value of the tire according to each of the examples and the comparative examples is represented by an index with the rolling resistance value of the tire according to the comparative example 1 set to be 100.

The specification of the tire according to each of the examples and the comparative examples is 225/55R16 (summer tire). A depth d1 of a groove is set to be 8.2 mm, a tread rubber gauge (a thickness D of a tread rubber layer) is set to be 10.0 mm, a cap rubber gauge (a dimension H from the base bottom portion of a base layer to a tread surface) is set to be 8.0 mm, a base rubber gauge (a dimension h2 from the base bottom portion of the base layer to the bottom face of a tread portion) is set to be 2.0 mm, and a subtread gauge H1 is set to be 1.8 mm.

The details of the tire according to each of the examples and the comparative examples are as follows.

Example 1

For a cap layer, a ratio to a tread rubber layer is 80% and a rubber hardness (JIS A hardness) is 64. Moreover, the composition of a rubber constituting the cap layer is of a blend I type and a predetermined amount of silica is blended. On the other hand, for a base layer, the ratio to the tread rubber layer is 20% and the rubber hardness is 60. The number of convex portions is two and the number of the exposed convex portions to a tread surface is two. Furthermore, the composition of a rubber constituting the base layer is of a blend II type, and the silica is not blended but carbon black is blended at a relatively high rate.

Example 2

For a cap layer, a ratio to a tread rubber layer is 80% and a rubber hardness (JIS A hardness) is 64. Moreover, the composition of a rubber constituting the cap layer is of a blend I type and a predetermined amount of silica is blended. On the other hand, for a base layer, the ratio to the tread rubber layer is 20% and the rubber hardness is 59. The number of convex portions is two and the number of the exposed convex portions to a tread surface is two. Furthermore, the composition of a rubber constituting the base layer is of a blend III type, and the silica is not blended but carbon black is blended at a relatively low rate.

Example 3

For a cap layer, a ratio to a tread rubber layer is 80% and a rubber hardness (JIS A hardness) is 64. Moreover, the composition of a rubber constituting the cap layer is of a blend I type and a predetermined amount of silica is blended. On the other hand, for a base layer, the ratio to the tread rubber layer is 20% and the rubber hardness is 59. The number of convex portions is six and the number of the exposed convex portions to a tread surface is two. Furthermore, the composition of a rubber constituting the base layer is of a blend III type, and the silica is not blended but carbon black is blended at a relatively low rate.

Example 4

For a cap layer, a ratio to a tread rubber layer is 80% and a rubber hardness (JIS A hardness) is 64. Moreover, the composition of a rubber constituting the cap layer is of a blend I type and a predetermined amount of silica is blended. On the other hand, for a base layer, the ratio to the tread rubber layer is 20% and the rubber hardness is 59. The number of convex portions is ten and the number of the exposed convex portions to a tread surface is four. Furthermore, the composition of a rubber constituting the base layer is of a blend III type, and the silica is not blended but carbon black is blended at a relatively low rate.

Example 5

For a cap layer, a ratio to a tread rubber layer is 80% and a rubber hardness (JIS A hardness) is 64. Moreover, the composition of a rubber constituting the cap layer is of a blend I type and a predetermined amount of silica is blended. On the other hand, for a base layer, the ratio to the tread rubber layer is 20% and the rubber hardness is 59. The number of convex portions is sixteen and the number of the exposed convex portions to a tread surface is eight. Furthermore, the composition of a rubber constituting the base layer is of a blend III type, and the silica is not blended but carbon black is blended at a relatively low rate.

Example 6

For a cap layer, a ratio to a tread rubber layer is 70% and a rubber hardness (JIS A hardness) is 64. Moreover, the composition of a rubber constituting the cap layer is of a blend I type and a predetermined amount of silica is blended. On the other hand, for a base layer, the ratio to the tread rubber layer is 30% and the rubber hardness is 60. The number of convex portions is ten and the number of the exposed convex portions to a tread surface is four. Furthermore, the composition of a rubber constituting the base layer is of a blend II type, and the silica is not blended but carbon black is blended at a relatively high rate.

Comparative Example 1

For a cap layer, a ratio to a tread rubber layer is 80% and a rubber hardness (JIS A hardness) is 64. Moreover, the composition of a rubber constituting the cap layer is of a blend I type and a predetermined amount of silica is blended. On the other hand, for a base layer, the ratio to the tread rubber layer is 20% and the rubber hardness is 60. The number of convex portions is one and the number of the exposed convex portions to a tread surface is one. Furthermore, the composition of a rubber constituting the base layer is of a blend II type, and the silica is not blended but carbon black is blended at a relatively high rate.

Comparative Example 2

For a cap layer, a ratio to a tread rubber layer is 80% and a rubber hardness (JIS A hardness) is 64. Moreover, the composition of a rubber constituting the cap layer is of a blend I type and a predetermined amount of silica is blended. On the other hand, for a base layer, the ratio to the tread rubber layer is 20% and the rubber hardness is 59. The number of convex portions is one and the number of the exposed convex portions to a tread surface is one. Furthermore, the composition of a rubber constituting the base layer is of a blend III type, and the silica is not blended but carbon black is blended at a relatively low rate.

Comparative Example 3

For a cap layer, a ratio to a tread rubber layer is 70% and a rubber hardness (JIS A hardness) is 64. Moreover, the composition of a rubber constituting the cap layer is of a blend I type and a predetermined amount of silica is blended. On the other hand, for a base layer, the ratio to the tread rubber layer is 30% and the rubber hardness is 66, and the base layer is extremely harder than that in each of the other examples and comparative examples. The number of convex portions is ten and the number of the exposed convex portions to a tread surface is four. Furthermore, the composition of a rubber constituting the base layer is of a blend IV type, and the silica is not blended but carbon black is blended at a relatively high rate.

Figure 4:
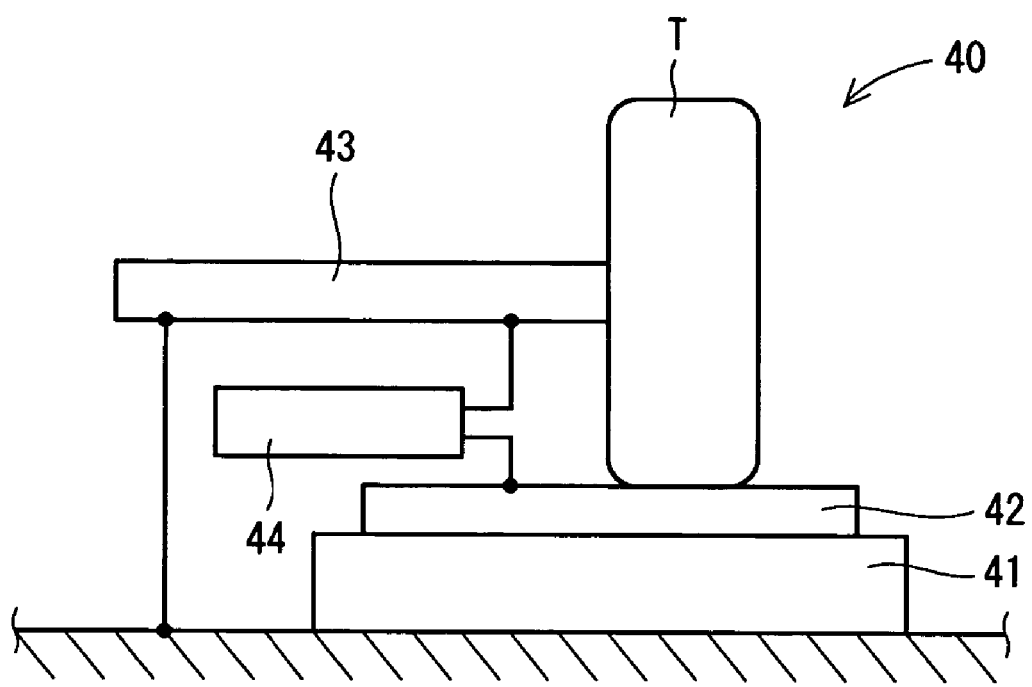
FIG. 4 is a view typically showing an apparatus for measuring the electric resistance value of the tire.

Next, description will be given to a method of testing the electric resistance value of the tire according to each of the examples and the comparative examples. As shown in FIG. 4, an apparatus 40 comprises an insulating plate 41 which is grounded, a metal plate 42 provided on the insulating plate 41, a tire attaching shaft 43 for holding a tire T to be a specimen (more specifically, the tire according to each of the examples and the comparative examples), and an electric resistance measuring device 44. The tire attaching shaft 43 is formed by a conductor. An electric resistance value test for the tire T is carried out by measuring the electric resistance value of a tire/rim Assy in accordance with JATMA rules.

A lubricant or dirt is previously eliminated sufficiently from the surface of the tire T and the tire T is fully dried. A rim is formed by a conductor and is adapted to a size (225/55R16) of the tire according to each of the examples and the comparative examples. In the test, the rim is formed of an aluminum alloy and has a size of 16×7-JJ. The internal pressure of the tire T is set to be 200 kPa. A load to be 80% of a maximum load capacity according to a standard (5.3 kN in the test) is applied to the tire T. A temperature in a test environment (a temperature in a test room) is set to be 25° C. and a humidity is set to be 50%.

The metal plate 42 has a surface polished smoothly, and an electric resistance value thereof is set to be equal to or smaller than 10 Ω. The insulating plate 41 has an electric resistance value set to be equal to or greater than $10^{12}$Ω. The measuring range of the electric resistance measuring device 44 is set to be $10^3$ to $1.6 \times 10^{16}$ Ω and a test voltage (an applied voltage) is set to be 1000 V.

The apparatus 40 is wired as shown in FIG. 4. More specifically, the tire attaching shaft 43 is grounded, and the metal plate 42 on which the tire T is to be mounted and the tire attaching shaft 43 are electrically connected to each other. In other words, a voltage is applied to the tire T to be the specimen through the metal plate 42 and the tire attaching shaft 43, and the electric resistance value of the tire T is measured based on the Ohm's law (V=IR, V: voltage, I: current, R: electric resistance).

The test is carried out in the following procedure.

(1) A rim is attached to the tire T from which a lubricant or dirt is previously eliminated sufficiently and which is fully dried as described above. Soapy water is used for this work.

(2) The tire T is left for two hours in a test room and is then attached to the tire attaching shaft 43.

(3) A load is applied to the tire prior to the test. More specifically, the predetermined load is applied to the tire T for 0.5 minute. Thereafter, the load is applied for 0.5 minute again and the load is then applied for two more minutes.

(4) The test voltage is applied. When five minutes pass, an electric resistance value between the tire attaching shaft 43 and the metal plate 42 is measured by the electric resistance measuring device 44.

(5) The test voltage and the load are removed. The tire T is rotated at 90 degrees around a radial direction thereof, and the electric resistance value is measured again in that condition in the way of (3) and (4). Subsequently, the tire T is rotated every 90 degrees in the same manner and the electric resistance value is measured in the way of (3) and (4). In other words, electric resistance values are measured on four points for one tire T and their maximum value is employed as the electric resistance value (measured value) of the tire T.

On the other hand, the rolling resistance of the tire T is measured by representing, as an index, the rolling resistance value of the tire according to each of the other comparative examples and the examples with the rolling resistance value of the tire according to the comparative example 1 set to be "100". In this case, a test speed is set to be 40 km/h, 80 km/h and 120 km/h, and a mean value of numeric values obtained by the measurement at respective speeds is employed as the index of the rolling resistance value. This index indicates that the rolling resistance is increased with an increase in the value.

TABLE 1

|  | Example 1 | Example 2 | Example 3 | Example 4 | Example 5 | Example 6 | Comp. Example 1 | Comp. Example 2 | Comp. Example 3 |
|---|---|---|---|---|---|---|---|---|---|
| Cap layer | Blend I | Blend I | Blend I | Blend I | Blend I | Blend I | Blend I | Blend I | Blend I |
| Ratio (%) | 80 | 80 | 80 | 80 | 80 | 70 | 80 | 80 | 70 |
| Rubber hardness (JISA) | 64 | 64 | 64 | 64 | 64 | 64 | 64 | 64 | 64 |
| Base layer | Blend II Large amount of carbon | Blend III Small amount of carbon | Blend III Small amount of carbon | Blend III Small amount of carbon | Blend III Small amount of carbon | Blend II Large amount of carbon | Blend II Large amount of carbon | Blend III Small amount of carbon | Blend IV Large amount of carbon |
| Ratio (%) | 20 | 20 | 20 | 20 | 20 | 30 | 20 | 20 | 30 |
| Rubber hardness (JISA) | 60 | 59 | 59 | 59 | 59 | 60 | 60 | 59 | 66 |
| Number convex portions | 2 | 2 | 6 | 10 | 16 | 10 | 1 | 1 | 10 |
| Number of exposures to surface | 2 | 2 | 2 | 4 | 8 | 4 | 1 | 1 | 4 |
| Rolling resitance index | 100 | 97 | 95 | 94 | 92 | 98 | 100 | 97 | 102 |
| Electric resistance ($\times 10^8 \Omega$) | 0.6 | 1.3 | 1.2 | 0.9 | 0.6 | 0.6 | 0.8 | 2.4 | 0.5 |

As shown in the Table 1, a tire having a large amount of carbon black to be blended has an excellent conductiveness, and therefore, has a small electric resistance value and a high rolling resistance. When the amount of carbon black to be blended is increased, moreover, the conductiveness is enhanced. Even if the number of the exposed convex portions is small, therefore, an excellent conductiveness is obtained. On the other hand, referring to the tire having a small amount of carbon black to be blended, the conductiveness is enhanced and the rolling resistance is also reduced with an increase in the number of the exposed convex portions. It can be supposed that the foregoing is caused by a reduction in an energy loss during the rolling of the tire because of a relative increase in the volume ratio of the base layer.

What is claimed is:

1. A pneumatic tire comprising a tread having (1) axially spaced apart base layers each containing carbon black provided on an inside in a radial direction and (2) a cap layer which is poor in conductivity and contains silica provided on an outside in the radial direction, the tread being provided with grooves on an outer peripheral surface constituting a tread surface, thereby forming a tread pattern, wherein each base layer has a plurality of circular convex portions which are formed like a comb and extend in a circumferential direction, the circular convex portions being exposed to the tread surface in nonuse, and wherein the grooves are provided on the outer peripheral surface so that a plurality of circular land portions is formed on the outer peripheral surface, and one of the base layers with the circular convex portions is provided in each of the circular land portions, and each base layer (1) has two to five circular convex portions and (2) does not contain silica.

2. The pneumatic tire according to claim 1, wherein each base layer has a hardness which is smaller than that of the cap layer and has a JIS A hardness of 55 to 65.

3. The pneumatic tire according to claim 1, wherein the tread has 8 or more circular convex portions which are exposed to the tread surface in nonuse.

4. The pneumatic tire according to claim 1, wherein each base layer has four circular convex portions.

* * * * *